United States Patent
Yang (10) Patent No.: US 10,091,728 B2
(45) Date of Patent: Oct. 2, 2018

(54) SYSTEM AND METHOD FOR TRANSMITTING A WAKE-UP PACKET

(71) Applicant: Futurewei Technologies, Inc., Plano, TX (US)

(72) Inventor: Yunsong Yang, San Diego, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 55 days.

(21) Appl. No.: 15/261,773

(22) Filed: Sep. 9, 2016

(65) Prior Publication Data

US 2018/0077641 A1 Mar. 15, 2018

(51) Int. Cl.
*H04W 52/02* (2009.01)
*H04L 29/06* (2006.01)
*H04W 84/12* (2009.01)

(52) U.S. Cl.
CPC ......... *H04W 52/0216* (2013.01); *H04L 69/22* (2013.01); *H04W 52/0229* (2013.01); *H04W 84/12* (2013.01)

(58) Field of Classification Search
CPC ......... H04W 52/0216; H04W 52/0229; H04W 84/12; H04L 69/22
See application file for complete search history.

(56) References Cited

U.S. PATENT DOCUMENTS

| 9,485,733 B1* | 11/2016 | Park | H04W 52/0235 |
| 2004/0190467 A1 | 9/2004 | Liu et al. | |
| 2017/0094600 A1* | 3/2017 | Min | H04W 52/0229 |
| 2018/0007629 A1* | 1/2018 | Dorrance | H04L 69/22 |
| 2018/0041959 A1 | 2/2018 | Yang et al. | |
| 2018/0063788 A1 | 3/2018 | Yang et al. | |

FOREIGN PATENT DOCUMENTS

| CN | 102685860 A | 9/2012 |
| WO | 2014071308 A1 | 5/2014 |

OTHER PUBLICATIONS

IEEE Standards Association, "IEEE Standard for Information Technology-Telecommunications and Information Exchange between Systems-Local and Metropolitan Area Networks-Specific Requirements; Part 11: Wireless LAN Medium Access Control (MAC) and Physical Layer (PHY) Specifications"; IEEE Std 802.11tm-2012, Mar. 29, 2012, 2793 pages.
Intel Corp., et al., "Low-Power Wake-Up Receiver (LP-WUR) for 802.11," IEEE 802.11-15/1307r1, Nov. 10, 2015, 18 pages.
Intel Corp., "LP-WUR (Low-Power Wake-Up Receiver): Enabling Low-Power and Low-Latency Capability for 802.11," IEEE 802.11-16/0027r0, Jan. 18, 2016, 21 pages.
Intel Corp., "LP-WUR (Low-Power Wake-Up Receiver) Follow-Up, " IEEE 802.11-16/0341r0; Mar. 14, 2016, 9 pages.

* cited by examiner

*Primary Examiner* — Duc C Ho
(74) *Attorney, Agent, or Firm* — Slater Matsil, LLP (57) ABSTRACT

A method for transmitting a wake-up packet includes generating a first preamble including a first length indication indicating a length of a payload for a first receiving device, generating a wake-up packet (WUP) for a second receiving device, generating a second preamble including a second length indication of a summation of lengths of the first preamble, the payload, and the WUP, and transmitting the second preamble, the first preamble, the payload, and the WUP.

22 Claims, 8 Drawing Sheets

SYSTEM AND METHOD FOR TRANSMITTING A WAKE-UP PACKET

TECHNICAL FIELD

The present invention relates generally to a system and method for digital communications, and, in particular embodiments, to a system and method for transmitting a wake-up packet.

BACKGROUND

Power consumption is a key consideration in devices that are battery powered. A design criterion for a battery powered device is to minimize power consumption to extend the period of time between battery recharges or replacement as much as possible. In some deployments, such as remotely located sensors, battery replacement may be both impractical as well as expensive. Even in situations where the battery powered device is readily available and recharging is easy, such as in cellular telephones, tablets, laptop computers, wearable devices (WDs), and so on, recharging the battery is still an inconvenient and time consuming task.

Radio communications modules (RCMs), which provide wireless connectivity that is so vital to the operation of these battery powered devices, are also significant sources of power consumption. Therefore, there is a need to reduce power consumption in battery powered devices with RCMs.

SUMMARY

Example embodiments provide a system and method for transmitting a wake-up packet.

In accordance with an example embodiment, a method for transmitting a wake-up packet is provided. The method includes generating, by a transmitting device, a first preamble including a first length indication indicating a length of a payload for a first receiving device, generating, by the transmitting device, a wake-up packet (WUP) for a second receiving device, generating, by the transmitting device, a second preamble including a second length indication of a summation of lengths of the first preamble, the payload, and the WUP, and transmitting, by the transmitting device, the second preamble, the first preamble, the payload, and the WUP.

In accordance with an example embodiment, a transmitting device is provided. The transmitting device includes a processor, and a computer readable storage medium storing programming for execution by the processor. The programming including instructions to configure the transmitting device to generate a first preamble including a first length indication indicating a length of a payload for a first receiving device, generate a WUP for a second receiving device, generate a second preamble including a second length indication of a summation of lengths of the first preamble, the payload, and the WUP, and transmit the second preamble, the first preamble, the payload, and the WUP.

In accordance with an example embodiment, a method for transmitting wake-up packets to a plurality of first receiving devices is provided. The method includes generating, by a transmitting device, a plurality of WUPs, generating, by the transmitting device, a first preamble including a first length indication of a first length that is greater than or equal to a summation of lengths of the plurality of WUPs, and transmitting, by the transmitting device, the first preamble and the plurality of WUPs.

In accordance with an example embodiment, a transmitting device is provided. The transmitting device includes a processor, and a computer readable storage medium storing programming for execution by the processor. The programming including instructions to configure the transmitting device to generate a plurality of WUPs, generate a first preamble including a first length indication of a first length that is greater than or equal to a summation of lengths of the plurality of WUPs, and transmit the first preamble and the plurality of WUPs.

In accordance with an example embodiment, a method for operating a receiving device is provided. The method includes receiving, by the receiving device, a continuous sequence of piggy-backed wake-up packets, determining, by the receiving device, that a wake-up packet of the contiguous sequence of piggy-backed wake-up packets is for the receiving device, and waking up, by the receiving device, a radio communications module (RCM) associated with the wake-up packet. The method also includes exchanging, by the receiving device, data with a transmitting device of the continuous sequence of piggy-backed wake-up packets using the RCM after waking up the RCM. The continuous sequence of piggy-backed wake-up packets is received contiguously. The determining that the wake-up packet is for the receiving device includes comparing a wake-up address from the wake-up packet with a wake-up address associated with the receiving device.

In accordance with an example embodiment, a receiving device is provided. The receiving device includes a processor, and a computer readable storage medium storing programming for execution by the processor. The programming including instructions to configure the receiving device to receive a continuous sequence of piggy-backed wake-up packets, determine that a wake-up packet of the contiguous sequence of piggy-backed wake-up packets is for the receiving device, and wake up a RCM associated with the wake-up packet. The programming includes instructions to configure the receiving device to exchange data with a transmitting device of the continuous sequence of piggy-backed wake-up packets using the RCM after waking up the RCM. The programming includes instructions to configure the receiving device to compare a wake-up address from the wake-up packet with a wake-up address associated with the receiving device.

A transmitting apparatus can be used for transmitting a wake-up packet. The transmitting apparatus (or element) can comprise a first generating means (or element) to generate a first preamble including a first length indication indicating a length of a payload for a first receiving device; a second generating means (or element) to generate a WUP for a second receiving device; a third generating means (or element) to generate a second preamble including a second length indication of a summation of lengths of the first preamble, the payload, and the WUP; and a transmitting means (or element) to transmit the second preamble, the first preamble, the payload, and the WUP.

A transmitting apparatus can be used for transmitting wake-up packets to a plurality of first receiving devices. The transmitting apparatus (or element) can comprise a first generating means (or element) to generate a plurality of WUPs; a second generating means (or element) to generate a first preamble including a first length indication of a first length that is greater than or equal to a summation of lengths of the plurality of WUPs; and a transmitting means (or element) to transmit the first preamble and the plurality of WUPs.

Various combinations of dependent claims 2, 3, 4, 5, 6, and 7; 9, 10, 11, and 12; 14, 15, 16, 17, and 18; and 20, 21, and 22 are possible.

Practice of the foregoing embodiments enables the piggybacking of a wake-up packet with a regular frame, therefore, the wake-up packet is not transmitted as a standalone physical protocol data unit, which would require channel contention, thereby increasing communications overhead. Furthermore, an IEEE 802.11 preamble does not need to be dedicated to the wake-up packet, further decreasing communications overhead.

An advantage of the forgoing embodiments includes reducing the communications overhead associated with transmitting one or more wake-up packet by piggy-backing one or more wake-up packets with a regular frame (forming a single protocol data unit), thereby reducing the number of channel contention procedures performed by a transmitting device. Another advantage of the foregoing embodiments includes reducing the communications overhead associated with transmitting one or more wake-up packet by piggy-backing one or more wake-up packets with a preamble (forming a single protocol data unit), thereby reducing the number of channel contention procedures performed by a transmitting device. Yet another advantage of the foregoing embodiments includes the piggy-backing enables the various components of the single protocol data unit (e.g., regular frame and one or more wake-up packets or preamble and one or more wake-up packets) to be transmitted without gaps, thereby further reducing the communications overhead.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the embodiments and ways to operate the embodiments disclosed herein, and do not limit the scope of the disclosure.

Figure 1:
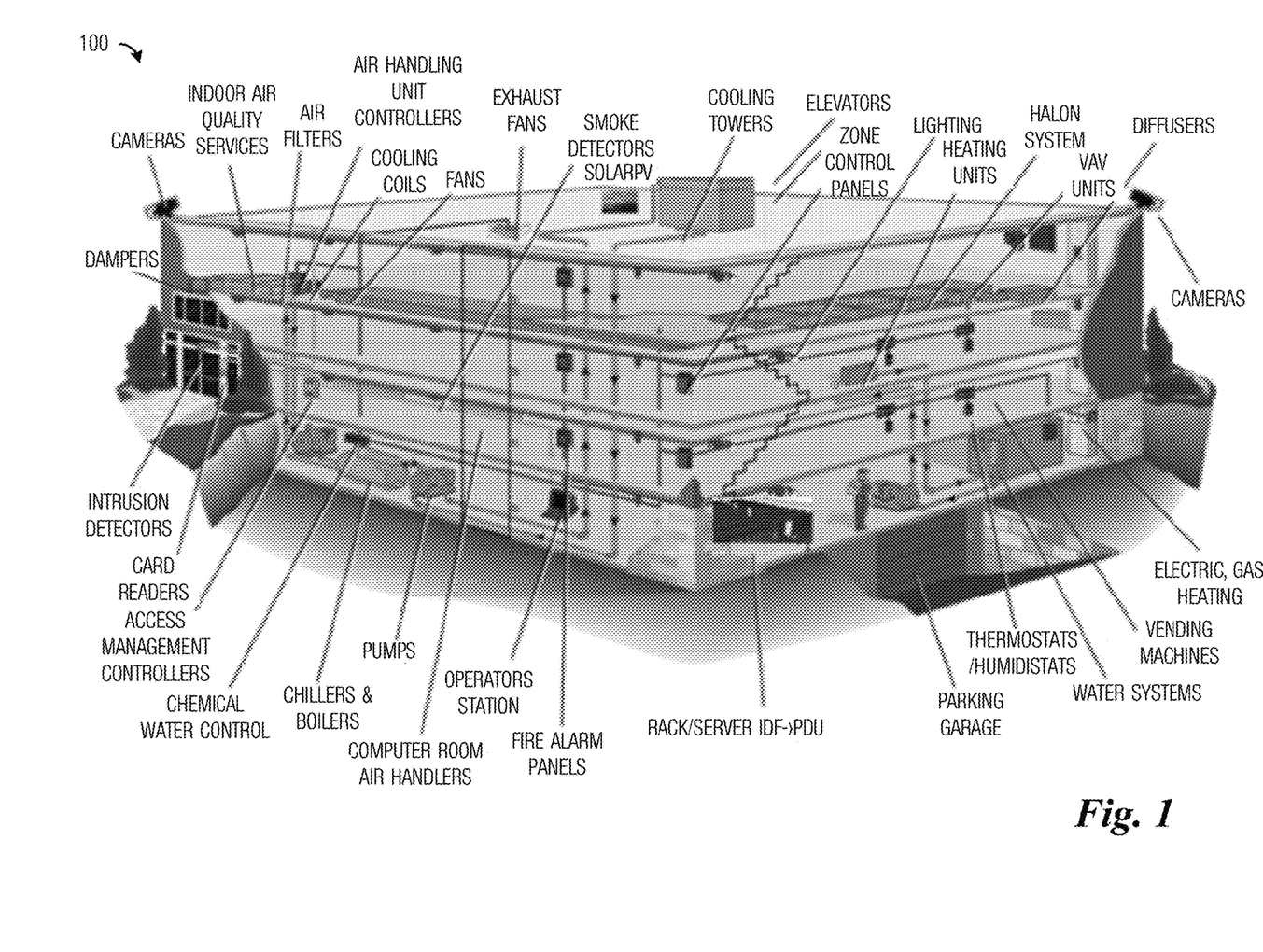
FIG. 1 illustrates an example smart building.

The Internet of Things (IoT) is a suite of technologies and applications that enable devices and locations to generate all kinds of information—and to connect those devices and locations for instant data analysis and, ideally, "smart" actions. For example, the IoT promises to facilitate smart buildings by uniting a variety of sensors and facility equipments into an integrated whole. FIG. 1 illustrates an example smart building 100 highlighting various sensors and monitoring devices, which are deployed in or around a commercial or residential building to monitor various conditions such as lighting, temperature, air quality, fire, smoke, CO gas, security, intrusion, etc., and various facility equipments such as lighting equipments, heating or cooling equipments, air ventilation equipments, fire alarms, sprinkling system, security alarms, information systems, etc., which are deployed to control the various fore-mentioned conditions in order to provide a healthy, comfort, and safe environment for people in the building and to do so in an energy-efficient manner. The various sensors and monitoring devices communicate with the various facility equipments, either directly or via a communications and control center, by using data communications technologies. For example, one or more data access points may be deployed throughout a smart building, where the data access points are connected to a center of communications, data analysis, and control, typically via wired connections such as cables. The data access points are also connected to the various sensors and monitoring devices, as well as communications modules on the various facility equipments, typically via radio communications (such as Wi-Fi, BlueTooth, and ZigBee), so that the various sensors and equipments may be deployed anywhere in the building at a later time without the need to alter the previous cable-wiring. Many of these sensors and the communications modules operate on battery power.

In addition, the IoT also promises to bring many other types of devices that operate on battery power and use radio communications, such as personal wearable devices in the consumer market, as well as sensors that are used in industrial IoT, such as in mining industry, transportation, agriculture, live stocks, etc.

Figure 2:
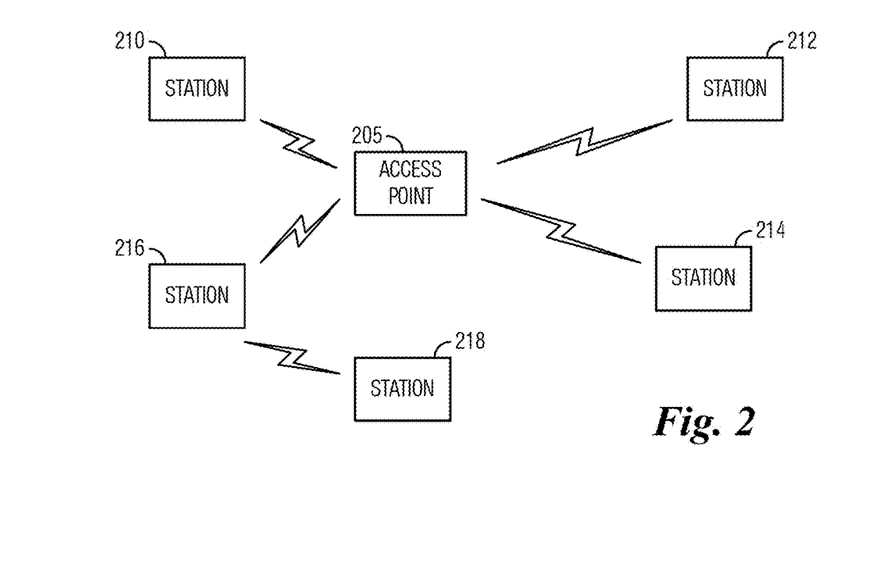
FIG. 2 illustrates an example IEEE 802.11 communications system.

FIG. 2 illustrates an example IEEE 802.11 communications system 200, which may be used for data communications in smart buildings. Communications system 200 includes an access point (AP) 205 that is serving a plurality of stations, such as stations 210, 212, 214, 216, and 218. For example, stations 210-218 may be the sensors, the monitoring devices, and the communications modules of the facility equipments in the smart building, and AP 205 may be the data access point in the smart building, as illustrated and described previously in FIG. 1. In a first operating mode, commonly referred to as infrastructure-based communications mode or Wireless LAN (WLAN) mode, access point 205 controls certain aspects (such as radio frequency channel, transmission power limit, authentication, security, etc.) of communications with or among its associated stations. Generally speaking, in communications system 200, wireless resources for both uplink (station to access point) and downlink (access point to station) transmissions are accessed by transmitters based on a distributed contention mechanism commonly referred to as carrier sensing multiple access with collision avoidance (CSMA/CA). However, access point 205 still may influence the resource allocation by assigning different access priorities to stations and/or traffic types, and when succeeding in channel contention, by explicitly allocating certain time periods for certain stations and/or traffics or for special purposes, such as Quiet Period during which time no transmitter may transmit.

In a second operating mode, commonly referred to as a direct communications mode, ad-hoc mode, or peer-to-peer mode, stations (such as station 216 and station 218) act as peer stations and may communicate directly with one another without going through a centralized entity such as access point 205. Examples of such direct communications include Wi-Fi Direct and neighbor awareness networking (NAN) compliant communications systems, both of which are specified by the Wi-Fi Alliance based on the IEEE 802.11 Standards.

While it is understood that communications systems may employ multiple access points capable of communicating with a number of UEs, only one access point and five stations are illustrated for simplicity.

As discussed before, many wearable devices, sensors, and IoT devices operate on battery power. Therefore, it is desired that the radio communications modules (RCMs) on these devices have low power consumption.

Figure 3:
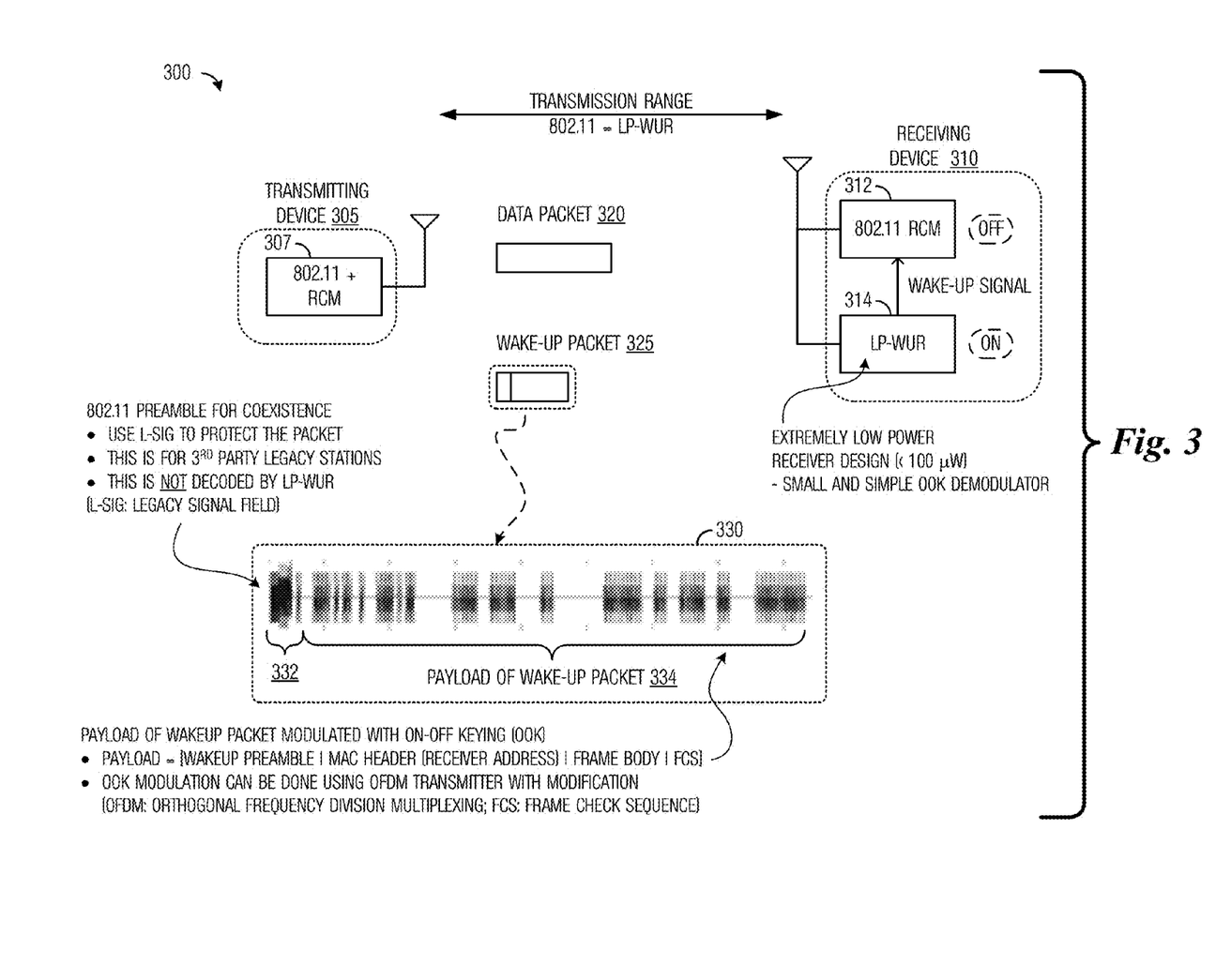
FIG. 3 illustrates an example IEEE 802.11 communications system with a low-power wake-up radio.

FIG. 3 illustrates an example IEEE 802.11 communications system 300 with a low-power wake-up radio (LP-WUR). Communications system 300 includes a transmitting device 305 and a receiving device 310. Transmitting device 305 includes, among other things, an enhanced 802.11 RCM (labeled "802.11+") 307. Enhanced 802.11 RCM 307 is capable of communications utilizing IEEE 802.11 standard signaling, as well as LP-WUR signaling, including the transmission of a wake-up packet. At least a payload portion of the wake-up packet may be transmitted over a much narrower channel bandwidth than the IEEE 802.11 standard signaling. For example, IEEE 802.11 standard signaling may be transmitted over a channel bandwidth of 20 MHz and the payload of the wake-up packet may be transmitted over a channel bandwidth of 5 MHz or less. A narrower bandwidth helps to reduce the cost and power consumption of an intended wake-up receiver, such as one in receiving device 310. A simple modulation and coding scheme (MCS), such as On-Off-Keying (OOK), is being considered for transmitting the wake-up packet in order to facilitate simple and low power receivers. However, OOK modulation tends to have a shorter reception range for a given signal-to-noise ratio (SNR) than other MCS levels. The narrower bandwidth helps to boost the transmission power spectrum density (and thus the received SNR) within the pass-band. A higher received SNR within the narrower pass-band helps to offset or partially offset the negative impact of the OOK modulation on the reception range of the wake-up packet.

Receiving device 310 includes, among other things, an 802.11 RCM 312 and a LP-WUR 314. 802.11 RCM 312 is intended for communicating user data while LP-WUR 314 is not. Thus, LP-WUR 314 usually does not have a transmitter. LP-WUR 314 is present to assist in waking up 802.11 RCM 312 from a sleeping or OFF mode. In general, LP-WUR 314 is ON when 802.11 RCM 312 is OFF (e.g., in the sleeping mode). LP-WUR 314 comprises a memory (or register) designed to store a value provided by a processor associated with 802.11 RCM 312, a receiver designed to receive at least the payload of the wake-up packet, and a comparator designed to compare a value in the received payload with the value stored in the memory. The comparator generates a signal referred to as a wake-up interrupt when the received value matches with the stored value. LP-WUR 314 is coupled to 802.11 RCM 312 through a connection used for carrying the wake-up interrupt, which may be used by LP-WUR 314 to wake up 802.11 RCM 312 from the sleeping mode. In computer science, an interrupt is a term used for a signal external to a processor that alerts the processor to a high-priority condition or event requiring the interruption of the current program the processor is executing. The processor responds by suspending its current activities and executing programs to deal with the event. The interruption may be temporary, and, after the execution of programs dealing with the event finishes, the processor may resume its current activities. For example, when there is no data communications for a while or when a sleep command is received, a processor associated with 802.11 RCM 312 may execute a program that places at least a major portion of the electronic circuits inside 802.11 RCM 312 into a sleeping mode, which may also be referred to as a power save mode or a power off mode. While the portion of the electronic circuits of 802.11 RCM 312 is in the sleeping mode, the capabilities of 802.11 RCM 312 is disabled to the extent that the 802.11 RCM 312 is no longer capable of communications utilizing IEEE 802.11 standard signaling. Later on, when receiving the wake-up interrupt generated by LP-WUR 314, the processor associated with 802.11 RCM 312 responds to the wake-up interrupt by powering up the electronic circuits inside 802.11 RCM 312 thereby resuming its capability to communicate utilizing IEEE 802.11 standard signaling. In general, when in the ON or active state, 802.11 RCM 312 will consume significantly greater amount of power than LP-WUR 314, at least one or two orders of magnitude more energy. An example target power consumption for LP-WUR 314 is less than 100 micro-watts while ON. The receiver of LP-WUR 314 has a narrow bandwidth matching the bandwidth of the payload of the wake-up packet, 5 MHz or less than, for example, and has a reception range that is approximately equal to that of 802.11 RCMs.

When performing 802.11 communications, transmitting device 305 transmits data packets, such as data packet 320, to receiving device 310, where 802.11 RCM 312 receives and processes the data packet.

As shown in FIG. 3, receiving device 310 initially is in a reduced power state. One of the ways that receiving device 310 is able to reduce power consumption is to turn OFF 802.11 RCM 312 while keeping LP-WUR 314 ON. When receiving device 310 is in the reduced power state, 802.11 RCM 312 is OFF and receiving device 310 is unable to receive or process 802.11 data packets.

However, LP-WUR 314 remains ON and receiving device 310 is able to receive wake-up packets, such as wake-up packet 325. In a situation where transmitting device 305 has data to transmit to receiving device 310, but receiving device 310 is in the reduced power state, transmitting device 305 first transmits a wake-up packet 325 to receiving device 310, e.g., using 802.11+ RCM 307. Wake-up packet 325 is received and processed by LP-WUR 314, which wakes up 802.11 RCM 312. Then, transmitting device 305 transmits data to receiving device 310 using 802.11+ RCM 307 and receiving device 310 receives the data using 802.11 RCM 312.

Highlight 330 provides a detailed view of an example wake-up packet, e.g., wake-up packet 325. The wake-up packet includes a preamble 332 and a payload 334. In order to maintain compatibility with 802.11 compliant devices in communications system 300, preamble 332 is an 802.11 legacy preamble transmitted over a channel bandwidth complaint with 802.11 standard signaling, such as 20 MHz. Preamble 332 is not to be detected by a LP-WUR, such as LP-WUR 314, because the receiver bandwidth of a LP-WUR is usually insufficient to receive 802.11 legacy preambles, such as preamble 332. Instead, preamble 332 is intended for legacy 802.11 devices to prevent them from transmitting during the transmission of payload 334. A RATE subfield and a LENGTH subfield of a Legacy SIGNAL field (L-SIG) in preamble 332 are used to indicate the duration of payload 334. Payload 334 includes information that is modulated using a simple modulation scheme, such as On-Off-Keying (OOK) and is transmitting over a narrower channel bandwidth, such as 5 MHz or less. Therefore, legacy 802.11 devices normally won't be able to decode payload 334 correctly. However, legacy 802.11 devices are capable of detecting preamble 332 because preamble 332 fully complies with the bandwidth and signal format of legacy 802.11 standards. Thus, when receiving preamble 332, legacy 802.11 devices recognize that the channel will be busy for at least a duration that is computed with the values in the RATE and LENGTH subfields and thereafter suspend their attempts of transmitting during the transmission of payload 334, as if payload 334 complied with IEEE 802.11 standard signaling. It is noted that OOK modulation may be implemented using an OFDM transmitter with relatively minor modification, for example, enhanced 802.11 RCM 307 is not only capable of OFDM modulated communications but also capable of transmitting signals that comply with OOK modulated waveform.

Figures 4A, 4B:
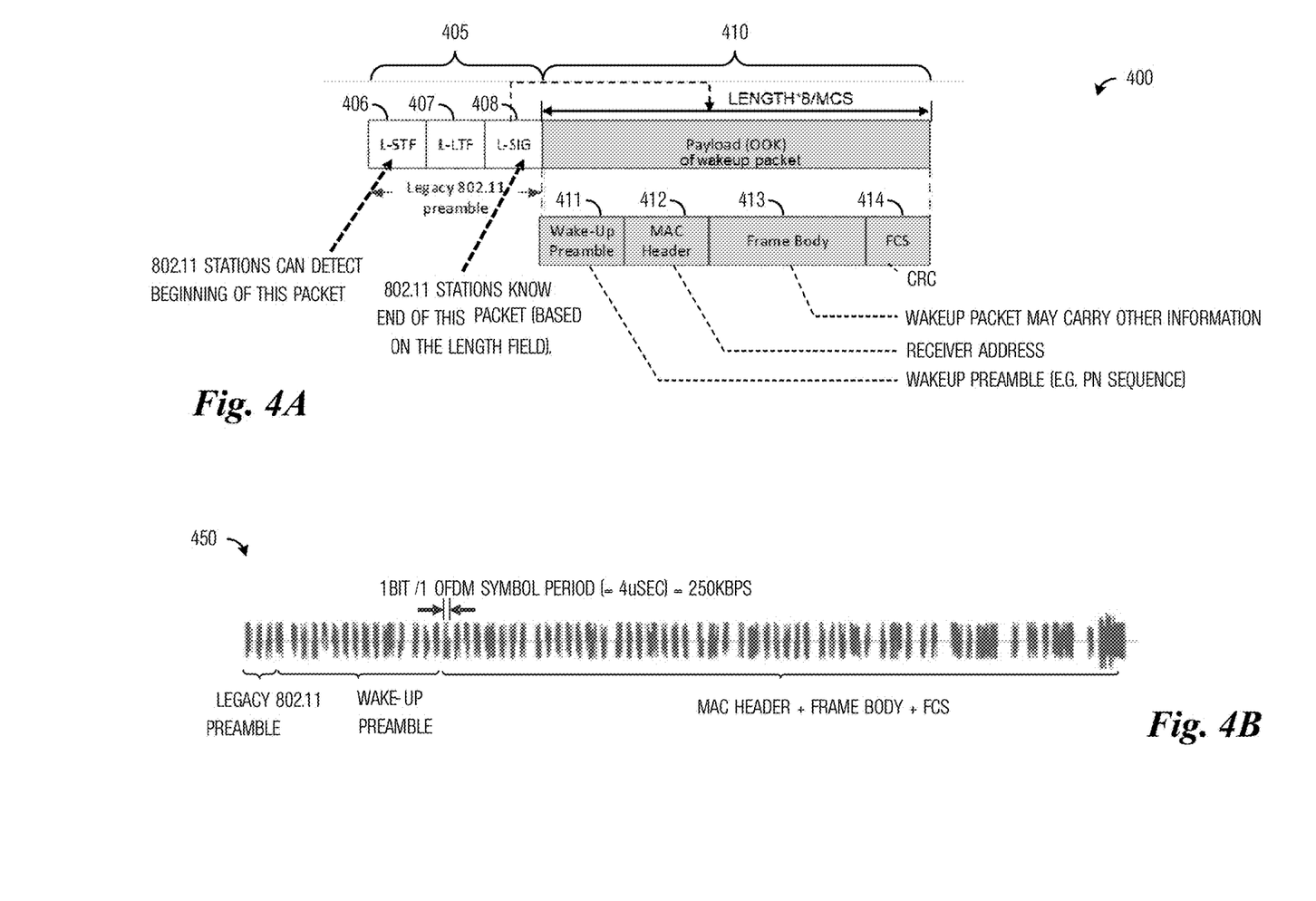
FIG. 4A illustrates a detailed view of an example wake-up packet.
FIG. 4B illustrates an example wake-up packet in signal form.

FIG. 4A illustrates a detailed view of an example wake-up packet 400. Wake-up packet 400 includes a preamble 405 and a payload 410. Preamble 405 is compliant to 802.11 technical standards (including the transmission bandwidth) and includes a Legacy short training field (L-STF) 406, a Legacy long training field (L-LTF) 407, and L-SIG 408. Payload 410 is transmitted over a narrower bandwidth than that of preamble 405. Payload 410 includes multiple fields, including a wake-up preamble 411 and a medium access control header (e.g., a receiver address) 412. Wake-up preamble 411 contains a wake-up sequence. The wake-up sequence may be a pseudo-random number sequence, for example, possessing good auto-correlation properties in order to assist LP-WURs to acquire timing for sampling and detecting the remainder of payload 410. Medium access control header 412 contains the wake-up address of a receiving device that wake-up packet 400 is intended to wake up. Payload 410 may also include a frame body 413 and a frame check sequence (FCS) 414. Frame body 413 may contain other information, such as a reason to wake up or a control parameter. FCS 414 includes a cyclic-redundancy check (CRC) for integrity checking wake-up packet 400.

FIG. 4B illustrates an example wake-up packet 450 in signal form. As shown in FIG. 4B, each bit in a payload (similar to payload 410) of wake-up packet 450 is transmitted over a period equal to an OFDM symbol period, which is 4 microseconds, for a total data rate of 250 kbps.

In the past, wake-up packets are generally viewed as stand-alone Physical (PHY) Protocol Data Units (PPDUs). Therefore, in order to transmit a wake-up packet, an AP has to separately contend for the channel in order to obtain a transmission opportunity. In order to win the channel contention, the AP needs to be able to detect that the channel has been idle for certain amount of the time (sum of an interframe interval and a random backoff time, for example). The requirement of the presence of these idle periods reduces the utilization of the channel for transmitting data traffics, to an effect similar to that of an additional communications overhead for the AP.

In order to provide compatibility for legacy devices, a legacy IEEE 802.11 preamble (such as preamble 405 of FIG. 4A) is inserted at the start of the wake-up packet to make the wake-up packet appear as an IEEE 802.11 signal. The legacy IEEE 802.11 preamble also enables legacy devices to know the end of the wake-up packet so that the legacy devices will not transmit during the transmission of the wake-up packet. The legacy IEEE 802.11 preamble is transmitted over a wideband (such as 20 MHz) before the wake-up packet that is transmitted over a narrow band (such as 5 MHz or less). The legacy IEEE 802.11 preamble is not used by the wake-up receiver because the bandwidth of the wake-up receiver is narrower. Therefore, the legacy IEEE 802.11 preamble is communications overhead as far as the wake-up receiver is concerned.

According to an example embodiment, a wake-up packet intended for a first station is piggy-backed after a regular frame that is intended for a second station. The piggy-backing of the wake-up packet with the regular frame enables a transmitting device, such as an AP or a station transmitting to another station or an AP, to contend for the channel a single time to transmit both the regular frame and the wake-up packet, as if the regular frame and the wake-up packet were a single PPDU instead of two PPDUs. The piggy-backing of the wake-up packet with the regular frame allows the transmission of the regular frame and the wake-up packet immediately after one another. Hence, there is no gap nor an 802.11 preamble, both of which would otherwise be required should the wake-up packet be transmitted as a separate PPDU, between the regular frame and the wake-up packet, thereby minimizing communications overhead associated with transmitting the wake-up packet by combining the wake-up packet with the regular frame.

According to an example embodiment, a wake-up packet intended for a first station is piggy-backed after an IEEE 802.11 frame that is intended for a second station to form a combined PPDU. The IEEE 802.11 frame may be a frame in compliance with a high throughput (HT) (which is also commonly referred to as IEEE 802.11n) frame format. A first length field in an outer PHY header of the IEEE 802.11 frame, such as a legacy length (denoted herein after as L_LENGTH in order to differentiate it from a second length field in an inner PHY header) subfield in a legacy signal (L-SIG) field in the legacy PHY header of the IEEE 802.11 frame, is adjusted with the addition of the duration of the wake-up packet to the existing value that reflects the duration of the IEEE 802.11 frame prior to pending the wake-up packet. Therefore, legacy stations (i.e., stations compliant with pre-IEEE 802.11n standards such as IEEE 802.11a, IEEE 802.11b, or IEEE 802.11g) receive the combined PPDU as if it is a single IEEE 802.11 frame. These legacy stations will set their NAVs in accordance with the L_LENGTH subfield, which prevents them from transmitting during the transmission of the combined PPDU, thereby protecting both the wake-up packet and the IEEE 802.11 frame.

A second length field in an inner PHY header of the IEEE 802.11 frame, such as the Length (denoted herein after as HT_LENGTH in order to different it from L_LENGTH) subfield in the HT-SIG field, indicates the length of useful data in the PHY Service Data Unit (PSDU) in the IEEE 802.11 frame intended for the second station, allowing the second station to decode the data correctly. The Duration field in the medium access control (MAC) header of the PSDU may also be adjusted accordingly so that other HT-capable (i.e., IEEE 802.11n-compliant) stations can use the value in the Duration field to set their respective NAVs.

Figure 5:
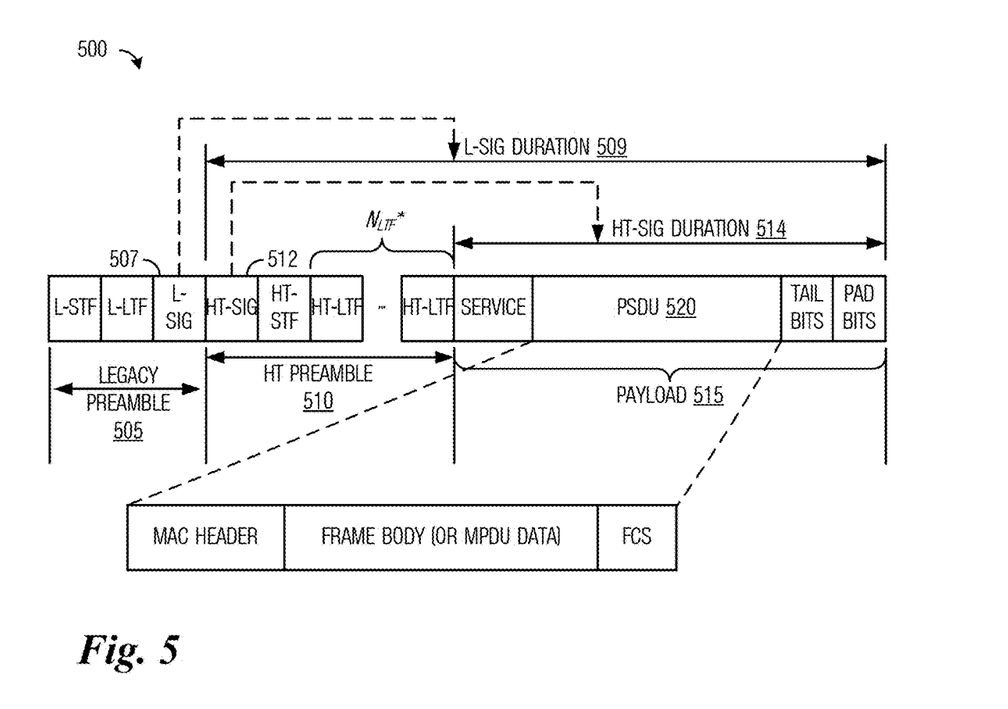
FIG. 5 illustrates a conventional IEEE 802.11n frame.

FIG. 5 illustrates a conventional IEEE 802.11n frame 500. Conventional IEEE 802.11n frame 500 includes a legacy preamble 505, which is an example of the outer PHY header, and an HT preamble 510, which is an example of the inner PHY header. Legacy preamble 505 includes an L-SIG field 507. L-SIG field 507 includes a RATE subfield and a LENGTH subfield that can be used together to compute a duration referred to as an L-SIG duration 509, during which time legacy stations (pre-HT or pre-IEEE 802.11n stations) are to remain off the air, i.e., not transmitting. The term of L-SIG duration 509 should be interpreted as a duration derived in accordance with the RATE and LENGTH values in L-SIG field 507, not as a duration of L-SIG field 507. The duration of L-SIG field 507 is well defined in IEEE 802.11 standards and there is no need to indicate it explicitly in any signaling. The L-SIG duration 509 corresponds to a duration of HT preamble 510 and a payload 515. HT preamble 510 includes an HT-SIG field 512 that includes a modulation and code scheme (MCS) subfield and a Length subfield that can be used together to compute a duration referred to as an HT-SIG duration 514, which HT compliant stations use to process PSDU 520 in payload 515. Similarly, the term of HT-SIG duration 514 should be interpreted as a duration derived in accordance with the MCS and Length values in HT-SIG field 512, not as a duration of HT-SIG field 512. The duration of HT-SIG field 512 is defined as two OFDM symbol periods in IEEE 802.11n standards. It is noted that the number of HT Long Training Field (HT-LTF) symbols $N_{LTF}$ is equal to the number of space-time streams $N_{STS}$, except in the situation with 3 space-time streams. In such a situation, 4 HT-LTF symbols are present in conventional IEEE 802.11n frame 500, where $N_{STS}$ is indicated in HT-SIG field 512.

Figure 6:
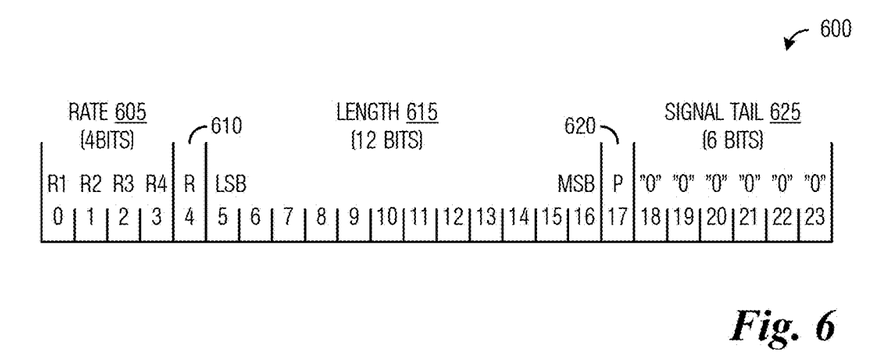
FIG. 6 illustrates an L-SIG field in a pre-IEEE 802.11n frame, a conventional IEEE 802.11n frame, as well as a piggy-backed frame according to example embodiments described herein.

FIG. 6 illustrates an L-SIG field 600 in a pre-IEEE 802.11n frame, a conventional IEEE 802.11n frame, as well as a piggy-backed frame in accordance with example embodiments of the present invention. L-SIG field 600 includes a 4-bit RATE subfield 605, a 1-bit reserved (R) subfield 610, a 12-bit LENGTH subfield 615 (which is an example of the first length field in the outer PHY header), a 1-bit parity (P) subfield 620, and a 6-bit signal tail bits subfield 625. In a pre-IEEE 802.11n frame, RATE subfield 605 is used to indicate a data rate (thus the modulation and code scheme), with which the remainder (after L-SIG field 600) of the frame is transmitted. However, in a conventional IEEE 802.11n frame as well as a piggy-backed frame, RATE subfield 605 is intentionally set to a value to indicate a data rate of 6 Mbps (referred herein after to as the dummy RATE), no matter what data rate is actually used for a payload of the frame. 6 Mbps is the lowest data rate with orthogonal frequency division multiplexing (OFDM) modulation supported in IEEE 802.11n. The lowest data rate is chosen for setting RATE subfield 605 in a conventional IEEE 802.11n frame as well as a piggy-backed frame so that when combined with a value in LENGTH subfield 615, which indicates a length of a payload in octets the longest time duration that can be possibly indicated is produced. So, in a conventional IEEE 802.11n frame as well as a piggy-backed frame, the number of bits per OFDM symbol $L\_N_{DBPS}$, as indicated by RATE subfield 605, is 24. A station transmitting the conventional IEEE 802.11n frame also needs to set LENGTH subfield 615 (also referred to as L_LENGTH subfield in order to differentiate from the second length field in the inner PHY header) to a value such that a L-SIG Duration (as indicated by RATE subfield 605 and LENGTH subfield 615) in microseconds (μsec) is equal to or greater than the duration spanning from the end of L-SIG field 507 to the end of padding (PAD) bits field as shown in FIG. 5. The relationship between L_LENGTH (in octets) and L-SIG Duration (in time) is expressible mathematically as $$L\text{-}SIG\text{ Duration} = \text{ceil}\left(\frac{16 + 8 \times L\_LENGTH + 6}{L\_N_{DBPS}}\right) \times 4 \text{ μsec,}$$

wherein a ceiling operator (ceil( )) is a round up function and $L\_N_{DBPS}=24$. The number of 16 reflects 16 bits in service field and the number of 6 reflects 6 bits in tail bits field as shown in FIG. 5.

A legacy IEEE 802.11 station that is not IEEE 802.11n compliant (i.e., a pre-IEEE 802.11 station) would receive L-SIG field 600 and use values in RATE subfield 605 and L_LENGTH subfield 615 to determine an L-SIG duration value, as shown above, for example, and set its NAV. The legacy IEEE 802.11 station would then avoid contending for the channel during the L-SIG duration after L-SIG field 600.

Figure 7:
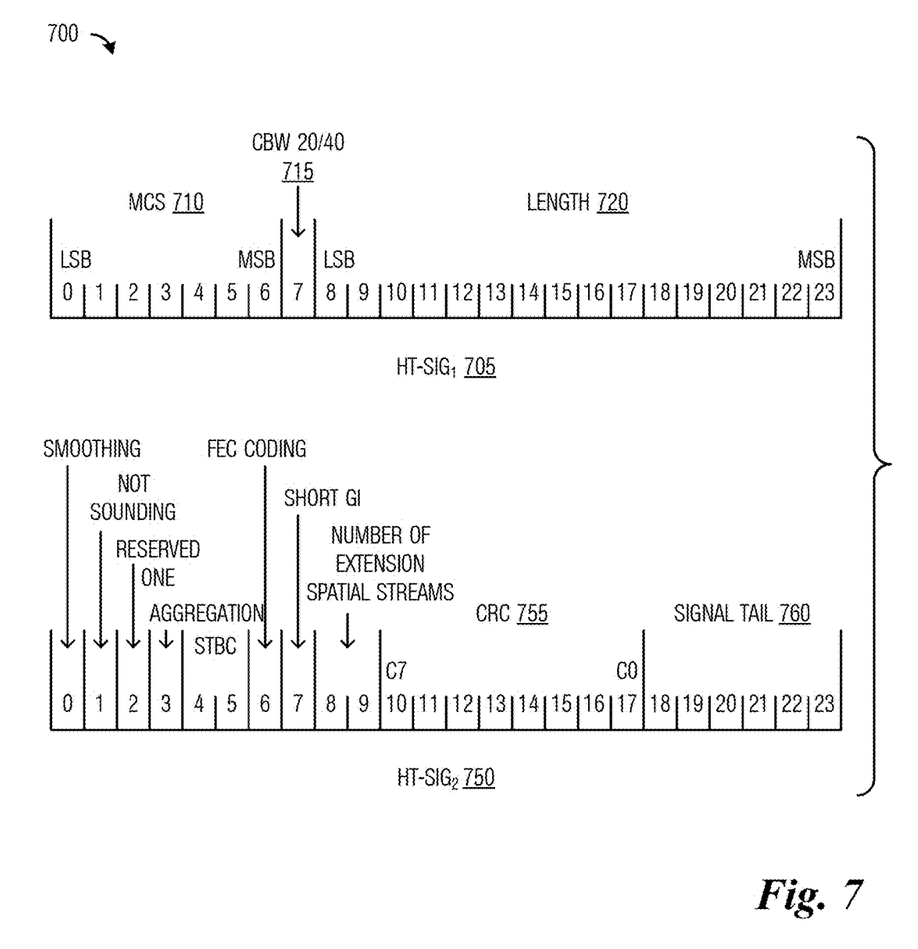
FIG. 7 illustrates an HT-SIG field in a conventional IEEE 802.11n frame, as well as a piggy-backed frame according to example embodiments described herein.

FIG. 7 illustrates an HT-SIG field 700 in a conventional IEEE 802.11n frame as well as a piggy-backed frame in accordance with example embodiments of the present invention. HT-SIG field 700 includes an HT-SIG1 field 705 and an HT-SIG2 field 750. HT-SIG1 field 705 includes a modulation and coding scheme (MCS) subfield 710, a carrier bandwidth (CBW) subfield 715, and a length subfield 720. HT-SIG2 field 750 includes subfields for smoothing, not sounding, reserved bit, aggregation, space-time block coding (STBC), forward error correcting (FEC) coding, short guard interval (GI), and number of extension spatial streams (i.e., $N_{STS}$). HT-SIG2 field 750 also includes a cyclic redundancy code (CRC) check subfield 755, and a signal tail subfield 760.

Length subfield 720 (also referred to as HT_LENGTH subfield in order to differentiate from the first length field in the outer PHY header) is an example of the second length field in the inner PHY header and is set to the data length (in octets) of the PSDU field (such as PSDU field 520 of FIG. 5). MCS subfield 710 indicates the MCS level used from a service field (such as the service field of FIG. 5 and FIG. 8) to a pad bits field (such as pad bits field of FIG. 5 and FIG. 8).

An HT compatible station derives the number of OFDM symbols ($N_{SYM}$) within the HT-SIG Duration in accordance with the MCS and HT_LENGTH values in HT-SIG field 700. The derivation of $N_{SYM}$ is expressible mathematically as $$N_{SYM} = \text{ceil}\left(\frac{16 + 8 \times HL\_LENGTH + 6}{HT\_N_{DBPS}}\right).$$

where $HT\_N_{DBPS}$ is the number of bits per OFDM symbol and is derived from the MCS level.

The derivation of the HT-SIG Duration is expressible mathematically as $$HT\text{-SIG Duration} = N_{SYM} \times 4 \text{ }\mu\text{sec}.$$

Therefore, L_LENGTH is set to satisfy the following $$\text{ceil}\left(\frac{16 + 8 \times L\_LENGTH + 6}{24}\right) \geq$$

$$\text{ceil}\left(\frac{16 + 8 \times HT\_LENGTH + 6}{HT\_N_{DBPS}}\right) + 3 + N_{LTF},$$

where $N_{LTF}$ is the number of OFDM symbols for HT-LTF and is equal to the number of space-time streams $N_{STS}$, except it is equal to 4 in the situation with 3 space-time streams. The number 3 is due to 2 OFDM symbols for HT-SIG field (such as HT-SIG field 512) and 1 OFDM symbol for HT-STF field.

According to an example embodiment, a wake-up packet intended for a first station is piggy-backed after an IEEE 802.11 frame that is intended for a second station, where the piggy-backed frame includes only the preamble(s) associated with the IEEE 802.11 frame. In other words, the IEEE 802.11 preamble (e.g., preamble 405 of wake-up packet 400 in FIG. 4A) of the wake-up packet is omitted. The IEEE 802.11 frame and the wake-up packet are transmitted as if they are a single PPDU. Therefore, the transmitting station only needs to perform channel contention once for transmitting both of them. Omission of the IEEE 802.11 preamble associated with the wake-up packet further helps to reduce communications overhead.

Figure 8:
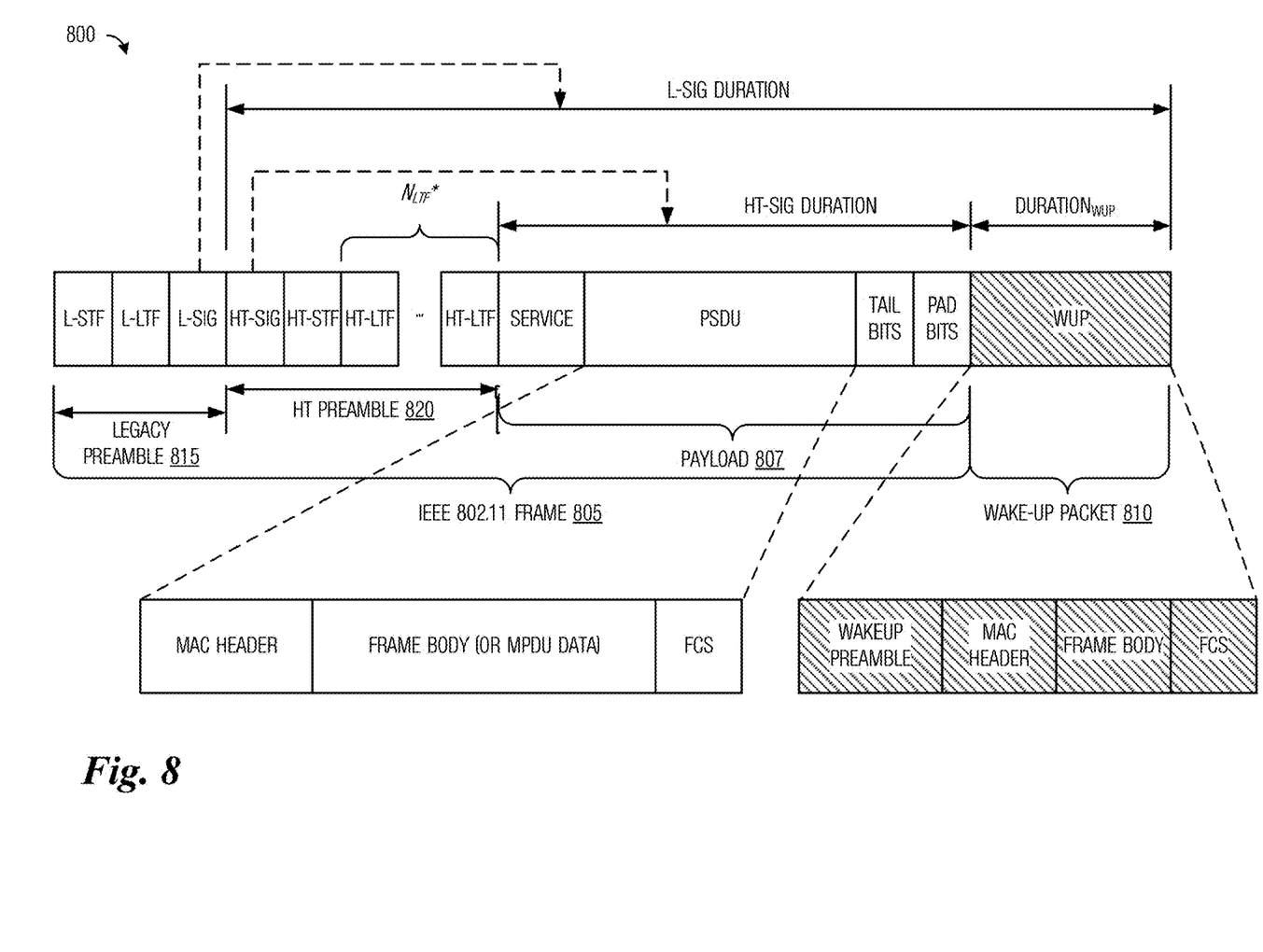
FIG. 8 illustrates an example piggy-backed frame according to example embodiments described herein.

FIG. 8 illustrates an example piggy-backed frame 800. Piggy-backed frame 800 includes an IEEE 802.11 frame 805 and a wake-up packet 810. IEEE 802.11 frame 805 is as described in FIGS. 5, 6, and 7 with exceptions related to how the L-SIG Duration and the L_LENGTH value are determined. The value of time in L-SIG Duration corresponds to the combined durations of HT preamble 820, a payload 807, and wake-up packet 810. The value of time in HT-SIG Duration still corresponds to value of time that HT compliant stations use to process the PSDU in payload 807. Wake-up packet 810 is as described in FIGS. 3, 4A, and 4B except that the legacy IEEE 802.11 preamble (such as legacy preamble 332 in FIG. 3 and legacy preamble 405 in FIG. 4A) is not included.

The transmitting station (such as the AP) of piggy-backed frame 800 sets the RATE subfield of the L-SIG field of the IEEE 802.11 frame 805 to indicate a rate of 6 Mbps and the L_LENGTH subfield of the L-SIG field to satisfy the following expression $$\text{ceil}\left(\frac{16 + 8 \times L\_LENGTH + 6}{24}\right) \geq$$

$$\text{ceil}\left(\frac{16 + 8 \times HT\_LENGTH + 6}{HT\_N_{DBPS}}\right) + 3 + N_{LTF} + \frac{\text{Duration}_{WUP}}{4},$$

where $\text{Duration}_{WUP}$ is the duration of the wake-up packet in µsec and HT_LENGTH, $HT\_N_{DBPS}$, and $N_{LTF}$ are as described previously.

Figure 9:
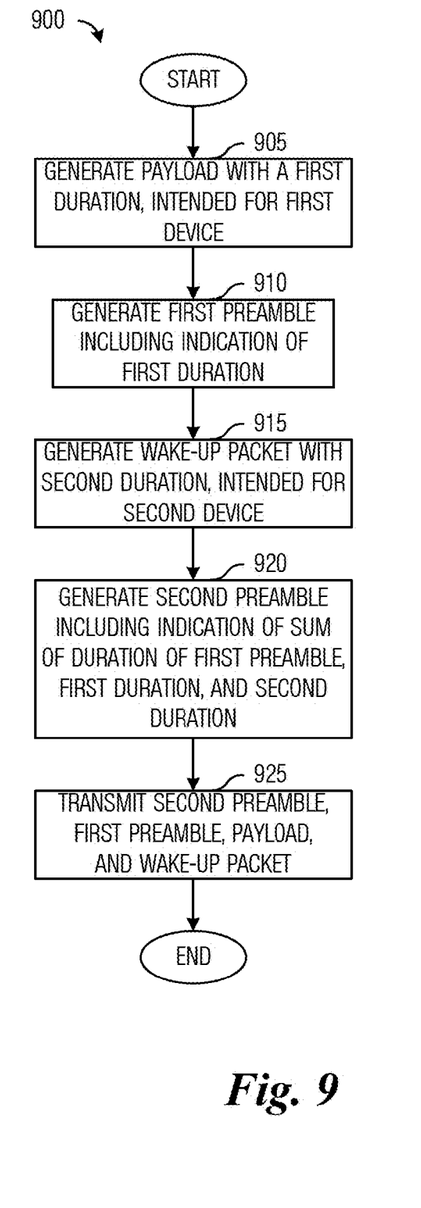
FIG. 9 illustrates a flow diagram of example operations occurring in a transmitting device according to example embodiments described herein.

FIG. 9 illustrates a flow diagram of example operations 900 occurring in a transmitting device. Operations 900 may be indicative of operations occurring in a transmitting device, such as an AP or a station, as the transmitting device transmits a wake-up packet by piggy-backing it after a regular frame, where the regular frame is intended for a first receiving device and the wake-up packet is intended for a second receiving device.

Operations 900 begin with the transmitting device generating a payload with a first duration (block 905). The payload is part of a frame and is intended for a first receiving device. The transmitting device generates a first preamble for the payload (block 910). The first preamble includes a first indication of a first length that is related to the first duration of the payload. The first indication of the first length is located in a first signal field of the first preamble, for example. The transmitting device generates a wake-up packet with a second duration (block 915). The wake-up packet is intended for a second receiving device. The transmitting device generates a second preamble for the first preamble, the payload, and the wake-up packet (block 920). The second preamble includes a second indication of a second length that is related to a sum of the durations of the first preamble, the payload, and the wake-up packet. The transmitting device may compute the sum of the durations of the first preamble, the payload, and the wake-up packet, then use the summed duration (in a time unit) and the dummy RATE (such as 6 Mbps) to determine a value of the second length in octets. The second indication of the second length is located in a second signal field of the second preamble, for example. The transmitting station transmits the second preamble, the first preamble, the payload, and the wake-up packet (block 925). The transmission of the second preamble, the first preamble, the payload, and the wake-up packet involves generating a PPDU that includes the second preamble, the first preamble, the payload, and the wake-up packet and then transmitting the PPDU. The second preamble, the first preamble, the payload, and the wake-up packet are transmitted in immediate succession. In other words, the second preamble, the first preamble, the payload, and the wake-up packet are transmitted one after the other without any gaps in between.

According to an example embodiment, a plurality of wake-up packets intended for different stations are piggy-backed after a regular frame (such as an IEEE 802.11 frame). The piggy-backing of the plurality of wake-up packets with the regular frame enables the transmitting device to contend for the channel a single time to transmit both the regular frame and the plurality of wake-up packets, as if the regular frame and the plurality of wake-up packets were a single PPDU instead of a plurality of PPDUs. A value in a first length field in an outer PHY header (such as the L_LENGTH subfield of the L-SIG field of the IEEE 802.11 frame) is adjusted to cover both the regular frame and the plurality of wake-up packets, while a value in a second length field in an inner PHY header (such as the HT_LENGTH subfield in the HT-SIG field of the IEEE 802.11 frame) is related to the duration of the regular frame. A value in a duration field in a MAC header of the regular frame is also adjusted to cover both the regular frame and the plurality of wake-up packets.

According to another example embodiment, a plurality of wake-up packets intended for different stations are piggy-backed after a legacy preamble (such as a legacy IEEE 802.11 preamble) without a payload of a regular frame (such as an IEEE 802.11 frame). In this situation, the legacy preamble and the plurality of wake-up packets are transmitted one after the other without any gaps in between. The piggy-backing of the plurality of wake-up packets after a single legacy IEEE 802.11 preamble enables the transmitting device to contend for the channel a single time to transmit the plurality of wake-up packets, as if the plurality of wake-up packets were a single PPDU instead of a plurality of PPDUs. The single legacy IEEE 802.11 preamble transmitted before the plurality of wake-up packets makes the entire combined PPDU appears as if an IEEE 802.11 compliant signal. The LENGTH subfield in the L-SIG field of the legacy IEEE 802.11 preamble, combined with the dummy RATE (such as 6 Mbps) as indicated in the RATE subfield of the L-SIG field, covers the total duration of the plurality of wake-up packets so that legacy station receiving the legacy IEEE 802.11 preamble will not transmit during the transmission of the plurality of wake-up packets.

Figure 10:
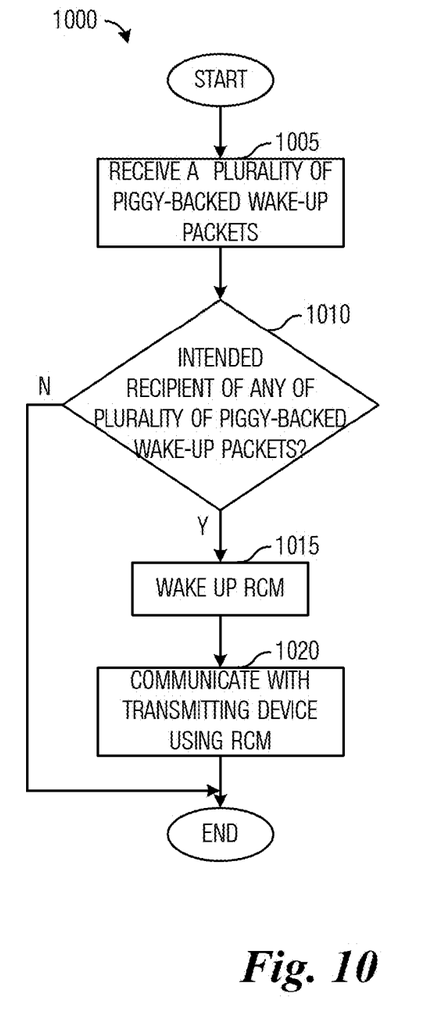
FIG. 10 illustrates a flow diagram of example operations occurring in a receiving device according to example embodiments described herein.

FIG. 10 illustrates a flow diagram of example operations 1000 occurring in a receiving device. Operations 1000 may be indicative of operations occurring in a receiving device, such as a station or an AP, as the receiving device receives a plurality of piggy-backed wake-up packets.

Operations 1000 begin with the receiving device receiving a plurality of piggy-backed wake-up packets (block 1005). The plurality of piggy-backed wake-up packets may be piggy-backed after a regular frame (such as an IEEE 802.11 frame) or after just a legacy preamble (such as a legacy (e.g., pre-IEEE 802.11n) IEEE 802.11 preamble). The each wake-up packet in the plurality of piggy-backed wake-up packets is received sequentially by the receiving device. The receiving device performs checks to determine if any of the wake-up packets is intended for the receiving device (block 1010). As an example, the receiving device compares the wake-up addresses in the wake-up packets with its own wake-up address and if there is a match, then the receiving device has received a wake-up packet intended for it.

If the receiving device has received a wake-up packet intended for it, the receiving device wakes up a radio control module (RCM) (block 1015). Detailed discussions of example systems and methods for waking up RCMs of a device and providing security therefore are presented in co-assigned U.S. provisional applications entitled "System and Method for Waking Up a Radio Communications Module of a Device," Application No. 62/370,509, filed Aug. 3, 2016, and "A System and Method for Secure and Quick Wake Up of a Station," Application Ser. No. 62/381,899, filed Aug. 31, 2016, which are hereby incorporated herein by reference. The receiving device communicates with a transmitting device using the woken up RCM (block 1020). If the receiving device has not received a wake-up packet intended for it, operations 1000 ends.

A significant percentage of sensor devices in operation today use IEEE 802.11n compliant chipsets due to their lower costs and low power consumption (when compared to IEEE 802.11ac compliant chipsets, for example). It is expected that IEEE 802.11n and wake-up radio technology will continue to be used together on many sensor devices, even as IEEE 802.11 technology further evolves, because most recent major enhancements on IEEE 802.11 technology are based on multiple antennas, which are unpractical for sensor devices due to their limited size, power budget, and cost budget for having multiple antennas in the first place. Therefore, a wake-up radio capable transmitting device may find many opportunities to piggy-back a wake-up packet after an HT frame or another wake-up packet. As an illustrative example, the transmitting device may utilize a strategy of waking up a sensor device at a time and piggy-back a wake-up packet intended for a second sensor device (with whom the transmitting device will next communicate with) with a last data frame transmitted to a first sensor device (with whom the transmitting device is currently communicating with).

As another example, a relay device, when sending an acknowledgement frame to an AP to acknowledge the reception of a downlink data frame designated to a station served by the relay device (but the station is currently in a sleep mode) may piggy-back a wake-up packet (targeting the station) with an acknowledgment frame transmitted to the AP.

It is noted that some IEEE 802.11 frames solicit an acknowledge (ACK) or response frame at one short interframe space (SIFS) after the end of the IEEE 802.11 frame (such as a request to send (RTS) frame, a clear to send (CTS), a block acknowledgement (BA) request frame or a BA frame with an ACK policy set to "normal ACK", an announcement traffic indication message (ATIM) frame, data frames, or management frames that require "normal ACK", for example). According to IEEE 802.11 standards, a "normal ACK" policy in a frame indicates that an intended recipient should send an ACK control frame after one short interframe space (SIFS) interval after receiving the frame. These frames generally cannot be used to piggy-back the wake-up packet due to a conflict between receiving the ACK or response frame and transmitting the wake-up packet.

However, the transmitting device (such as the AP) can be selective when picking an HT frame to piggy-back with the wake-up packet, e.g., by selecting a management or data frame with ACK policy bits (i.e., bits B5 and B6 of the Quality of Service (QoS) control field in the MAC header) set to "10" for "no ACK" or "11" for "block ACK". According to IEEE 802.11 standards, a "no ACK" policy in a frame indicates that an intended recipient should not send an ACK control frame after receiving the frame; and a "Block ACK" policy in a frame indicates that an intended recipient should cache the result of the reception of the frame, wait to receive a Block ACK (BA) Request frame from the same transmitting station, then respond to the Block ACK Request frame with a Block ACK frame including the cached result. In the situation where the data or management frames does require an acknowledgement, the transmitting device may change the ACK policy of the frame from "normal ACK" to "block ACK" and send a BA Request frame to solicit the BA frame at a later time, e.g., after the wake-up packet has been transmitted.

Figure 11:
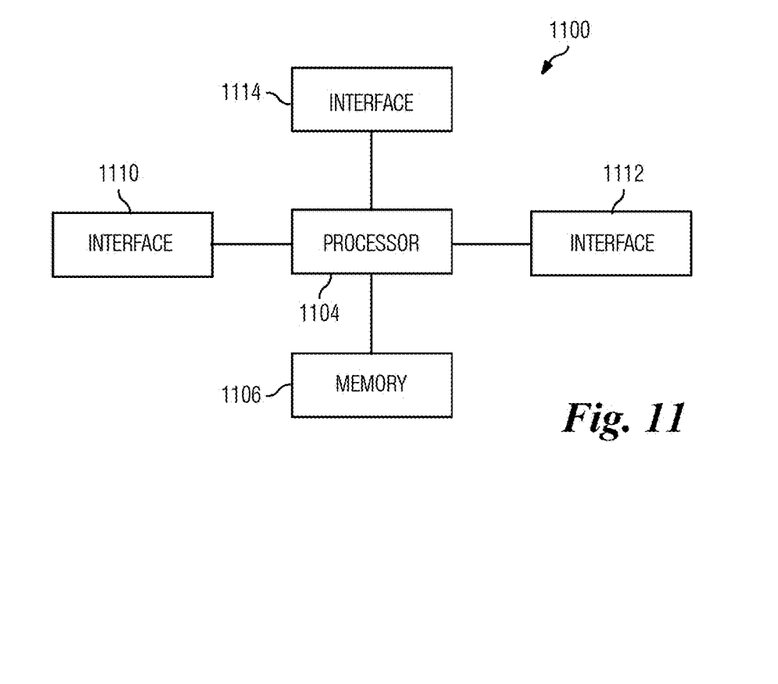
FIG. 11 illustrates a block diagram of an embodiment processing system for performing methods described herein.

FIG. 11 illustrates a block diagram of an embodiment processing system 1100 for performing methods described herein, which may be installed in a host device. As shown, the processing system 1100 includes a processor 1104, a memory 1106, and interfaces 1110-1114, which may (or may not) be arranged as shown in FIG. 11. The processor 1104 may be any component or collection of components adapted to perform computations and/or other processing related tasks, and the memory 1106 may be any component or collection of components adapted to store programming and/or instructions for execution by the processor 1104. A means for generating preambles, length indications, payloads, wake-up packets, acknowledgement policy indications, and PPDUs may include processor 1104. A means for performing channel contention may include processor 1104. In an embodiment, the memory 1106 includes a non-transitory computer readable medium. The interfaces 1110, 1112, 1114 may be any component or collection of components that allow the processing system 1100 to communicate with other devices/components and/or a user. For example, one or more of the interfaces 1110, 1112, 1114 may be adapted to communicate data, control, or management messages from the processor 1104 to applications (such as a sensor) installed on the host device and/or a remote device. As another example, one or more of the interfaces 1110, 1112, 1114 may be adapted to allow a user or user device (e.g., personal computer (PC), etc.) to interact/communicate with the processing system 1100. The processing system 1100 may include additional components not depicted in FIG. 11, such as long term storage (e.g., non-volatile memory, etc.).

In some embodiments, the processing system 1100 is included in a network device that is accessing, or part otherwise of, a telecommunications network. In one example, the processing system 1100 is in a network-side device in a wireless or wireline telecommunications network, such as an access point, a base station, a relay station, a scheduler, a controller, a gateway, a router, an applications server, or any other device in the telecommunications network. In other embodiments, the processing system 1100 is in a user-side device accessing a wireless or wireline telecommunications network, such as a sensor device, a mobile station, a user equipment (UE), a personal computer (PC), a tablet, a wearable communications device (e.g., a smartwatch, etc.), or any other device adapted to access a telecommunications network.

Figure 12:
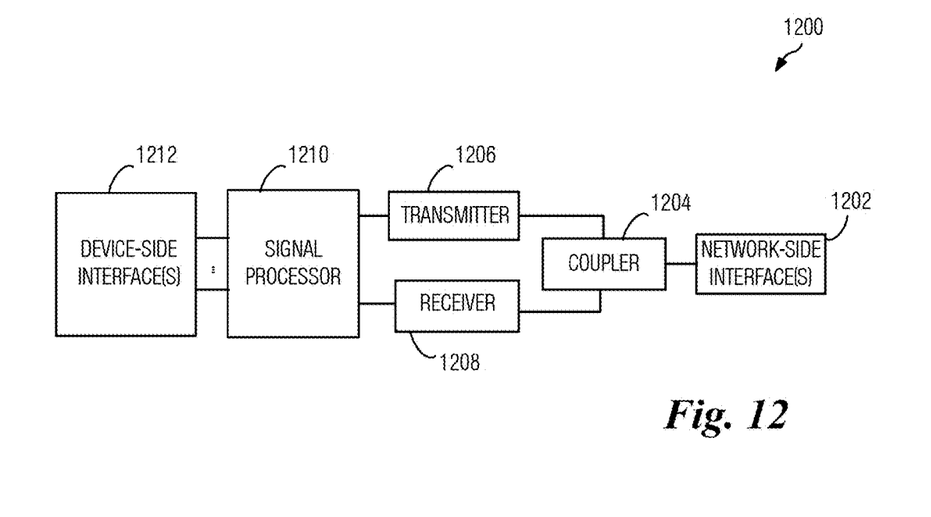
FIG. 12 illustrates a block diagram of a transceiver adapted to transmit and receive signaling over a telecommunications network according to example embodiments described herein.

In some embodiments, one or more of the interfaces 1110, 1112, 1114 connects the processing system 1100 to a transceiver adapted to transmit and receive signaling over the telecommunications network. FIG. 12 illustrates a block diagram of a transceiver 1200 adapted to transmit and receive signaling over a telecommunications network. The transceiver 1200 may be installed in a host device. As shown, the transceiver 1200 comprises a network-side interface 1202, a coupler 1204, a transmitter 1206, a receiver 1208, a signal processor 1210, and a device-side interface 1212. The network-side interface 1202 may include any component or collection of components adapted to transmit or receive signaling over a wireless or wireline telecommunications network. The coupler 1204 may include any component or collection of components adapted to facilitate bi-directional communication over the network-side interface 1202. The transmitter 1206 may include any component or collection of components (e.g., up-converter, power amplifier, etc.) adapted to convert a baseband signal into a modulated carrier signal suitable for transmission over the network-side interface 1202. A means for transmitting preambles, payloads, wake-up packets, data, and PPDUs may include transmitter 1206. The receiver 1208 may include any component or collection of components (e.g., down-converter, low noise amplifier, etc.) adapted to convert a carrier signal received over the network-side interface 1202 into a baseband signal. Besides the components adapted to receive the wide band communications signal, receiver 1208 may further include components adapted to receive a narrow-band wake-up signal (such as a wake-up packet in a piggy-backed frame, as shown in FIG. 8). Alternatively, a wake-up receiver, which includes components adapted to receive the narrow-band wake-up signal, is implemented in parallel to receiver 1208 with a connection to receiver 1208, which would allow the wake-up receiver to wake up receiver 1208. A means for receiving preambles, payloads, wake-up packets, data, and PPDUs may include receiver 1208. The signal processor 1210 may include any component or collection of components adapted to convert a baseband signal into a data signal suitable for communication over the device-side interface(s) 1212, or vice-versa. The device-side interface(s) 1212 may include any component or collection of components adapted to communicate data-signals between the signal processor 1210 and components within the host device (e.g., the processing system 1100, local area network (LAN) ports, etc.).

The transceiver 1200 may transmit and receive signaling over any type of communications medium. In some embodiments, the transceiver 1200 transmits and receives signaling over a wireless medium. For example, the transceiver 1200 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, ZigBee, near field communication (NFC), etc.). In such embodiments, the network-side interface 1202 comprises one or more antenna/radiating elements. For example, the network-side interface 1202 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1200 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a generating unit/module, a determining unit/module, and/or a waking unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method for transmitting a wake-up packet, the method comprising:
  generating, by a transmitting device, a first preamble including a first length indication indicating a length of a payload for a first receiving device;
  generating, by the transmitting device, a wake-up packet (WUP) for a second receiving device;
  generating, by the transmitting device, a second preamble including a second length indication of a summation of lengths of the first preamble, the payload, and the WUP; and
  transmitting, by the transmitting device, the second preamble, the first preamble, the payload, and the WUP.

2. The method of claim 1, wherein transmitting the second preamble, the first preamble, the payload, and the WUP comprises:
  generating, by the transmitting device, a physical protocol data unit (PPDU) including the second preamble, the first preamble, the payload, and the WUP; and
  transmitting, by the transmitting device, the PPDU.

3. The method of claim 1, further comprising performing, by the transmitting device, a channel contention before transmitting the second preamble, the first preamble, the payload, and the WUP.

4. The method of claim 1, wherein the wake-up packet is configured to wake up a first radio communications module (RCM) of the second receiving device from a sleeping mode, and wherein the method further comprises exchanging, by the transmitting device, data with the second receiving device using a second RCM associated with the first RCM after waking up the first RCM.

5. The method of claim 1, wherein the payload further comprises an acknowledgement policy indication indicating a "no acknowledgment" acknowledgement policy, the acknowledgement policy indication comprising a binary value of "10" for bits B5 and B6 of a quality of service (QoS) control field in a medium access control (MAC) header of the payload.

6. The method of claim 1, wherein the payload further comprises an acknowledgement policy indication indicating a "block acknowledgment" acknowledgement policy, the acknowledgement policy indication comprising a binary value of "11" for bits B5 and B6 of a QoS control field in a MAC header of the payload.

7. The method of claim 6, further comprising:
transmitting, by the transmitting device, a block acknowledgement request frame to the first receiving device a specified amount of time after transmitting the WUP; and
receiving, by the transmitting device, a block acknowledgement frame from the first receiving device.

8. A transmitting device comprising:
a non-transitory memory storage comprising instructions; and
a processor in communication with the non-transitory memory storage, wherein the processor executes the instructions to:
generate a first preamble including a first length indication indicating a length of a payload for a first receiving device,
generate a wake-up packet (WUP) for a second receiving device,
generate a second preamble including a second length indication of a summation of lengths of the first preamble, the payload, and the WUP, and
transmit the second preamble, the first preamble, the payload, and the WUP.

9. The transmitting device of claim 8, wherein the processor executes the instructions to generate a physical protocol data unit (PPDU) including the second preamble, the first preamble, the payload, and the WUP, and transmit the PPDU.

10. The transmitting device of claim 8, wherein the wake-up packet is configured to wake up a first radio communications module (RCM) of the second receiving device from a sleeping mode, and wherein the processor executes the instructions to exchange data with the second receiving device using a second RCM associated with the first RCM after waking up the first RCM.

11. The transmitting device of claim 8, wherein the processor executes the instructions to include, in the payload, an acknowledgment policy indication indicating a "no acknowledgement" acknowledgement policy for the first receiving device.

12. The transmitting device of claim 8, wherein the processor executes the instructions to include, in the payload, an acknowledgment policy indication indicating a "block acknowledgement" acknowledgement policy for the first receiving device, transmit a block acknowledgement request frame to the first receiving device a specified amount of time after transmitting the WUP, and receive a block acknowledgement frame from the first receiving device.

13. A method for transmitting wake-up packets to a plurality of first receiving devices, the method comprising:
generating, by a transmitting device, a plurality of wake-up packets (WUPs);
generating, by the transmitting device, a first preamble including a first length indication of a first length that is greater than or equal to a summation of lengths of the plurality of WUPs; and
transmitting, by the transmitting device, the first preamble and the plurality of WUPs.

14. The method of claim 13, wherein transmitting the first preamble and the plurality of WUP comprises:
generating, by the transmitting device, a physical protocol data unit (PPDU) including the first preamble and the plurality of WUPs; and
transmitting, by the transmitting device, the PPDU.

15. The method of claim 13, further comprising performing, by the transmitting device, a channel contention before transmitting the first preamble and the plurality of WUPs.

16. The method of claim 13, wherein each of the plurality of WUPs is configured to wake up a first radio communications module (RCM) of an associated first receiving device of the plurality of the first receiving devices from a sleeping mode, and wherein the method further comprises exchanging, by the transmitting device, data with at least one first receiving device of the plurality of the first receiving devices using at least one second RCM associated with at least one first RCM of the at least one first receiving device.

17. The method of claim 13, further comprising generating, by the transmitting device, a second preamble including a second length indication indicating a second length of a payload for a second receiving device, wherein transmitting the first preamble and the plurality of WUPs comprises transmitting, by the transmitting device, the first preamble, the second preamble, the payload, and the plurality of WUPs, and wherein the first length is equal to a summation of lengths of the second preamble, the payload, and the plurality of WUPs.

18. The method of claim 17, wherein transmitting the first preamble, the second preamble the payload, and the plurality of WUPs comprises:
generating, by the transmitting device, a physical protocol data unit (PPDU) including the first preamble, the second preamble, the payload, and the plurality of WUPs; and
transmitting, by the transmitting device, the PPDU.

19. A transmitting device comprising:
a non-transitory memory storage comprising instructions; and
a processor in communication with the non-transitory memory storage, wherein the processor executes the instructions to:
generate a plurality of wake-up packets (WUPs),
generate a first preamble including a first length indication of a first length that is greater than or equal to a summation of lengths of the plurality of WUPs, and
transmit the first preamble and the plurality of WUPs.

20. The transmitting device of claim 19, wherein the processor executes the instructions to generate a physical protocol data unit (PPDU) including the first preamble and the plurality of WUPs, and transmit the PPDU.

21. The transmitting device of claim 19, wherein each of the plurality of WUPs is configured to wake up a first radio communications module (RCM) of an associated first receiving device of a plurality of first receiving devices from a sleeping mode, and wherein the processor executes the instructions to exchange data with at least one first receiving device of the plurality of the first receiving devices using at least one second RCM associated with at least one first RCM of the at least one first receiving device.

22. The transmitting device of claim 19, wherein the processor executes the instructions to generate a second preamble including a second length indication indicating a second length of a payload for a second receiving device, and transmit the first preamble, the second preamble, the payload, and the plurality of WUPs, and wherein the first length is equal to a summation of lengths of the second preamble, the payload, and the plurality of WUPs.

\* \* \* \* \*